(12) United States Patent
Henze et al.

(10) Patent No.: US 11,851,523 B2
(45) Date of Patent: Dec. 26, 2023

(54) AGING-RESISTANT TPU

(71) Applicant: BASF SE, Ludwigshafen am Rhein (DE)

(72) Inventors: Oliver Steffen Henze, Lemfoerde (DE);
Dirk Kempfert, Lemfoerde (DE);
Oliver Muehren, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 625 days.

(21) Appl. No.: 16/768,408

(22) PCT Filed: Nov. 30, 2018

(86) PCT No.: PCT/EP2018/083146
§ 371 (c)(1),
(2) Date: May 29, 2020

(87) PCT Pub. No.: WO2019/106148
PCT Pub. Date: Jun. 6, 2019

(65) Prior Publication Data
US 2020/0385511 A1 Dec. 10, 2020

(30) Foreign Application Priority Data

Nov. 30, 2017 (EP) .................................. 17204666

(51) Int. Cl.
*C08G 18/76* (2006.01)
*C08G 18/08* (2006.01)
*C08G 18/24* (2006.01)
*C08G 18/32* (2006.01)
*C08G 18/42* (2006.01)
*C08G 18/44* (2006.01)
*C08G 18/66* (2006.01)
*C08K 5/3492* (2006.01)

(52) U.S. Cl.
CPC ..... *C08G 18/7671* (2013.01); *C08G 18/0895* (2013.01); *C08G 18/244* (2013.01); *C08G 18/3206* (2013.01); *C08G 18/4202* (2013.01); *C08G 18/4213* (2013.01); *C08G 18/44* (2013.01); *C08G 18/664* (2013.01); *C08K 5/34924* (2013.01)

(58) Field of Classification Search
CPC .............. C08G 18/0895; C08G 18/244; C08G 18/3206; C08G 18/4202; C08G 18/4213; C08G 18/4269; C08G 18/44; C08G 18/664; C08G 18/7671; C08K 5/0066; C08K 5/34924; C08L 75/06; H01B 3/302
See application file for complete search history.

(56) References Cited

U.S. PATENT DOCUMENTS

| | | | |
|---|---|---|---|
| 3,509,233 | A | 4/1970 | Muller et al. |
| 5,656,713 | A | 8/1997 | Sarpeshkar et al. |
| 6,166,135 | A | 12/2000 | Kaufhold et al. |
| 2015/0284537 | A1 | 10/2015 | Henze et al. |
| 2016/0053058 | A1* | 2/2016 | Tabor .................. C08G 63/916 524/498 |
| 2016/0333134 | A1 | 11/2016 | Hieber et al. |

FOREIGN PATENT DOCUMENTS

| | | |
|---|---|---|
| CN | 103897137 A * | 7/2014 |
| DE | 198 00 287 A1 | 7/1999 |
| DE | 10 2013 021 027 A1 | 6/2015 |
| EP | 1 043 349 A2 | 10/2000 |
| EP | 1 419 188 B1 | 2/2007 |
| WO | WO 2013/190118 A1 | 12/2013 |
| WO | WO 2015/090952 A1 | 6/2015 |
| WO | WO 2017/108920 A1 | 6/2017 |

OTHER PUBLICATIONS

U.S. Appl. No. 16/078,041, filed Aug. 21, 2018, US 2019-0055341, Prissok, et al.
International Search Report dated Feb. 21, 2019 in PCT/EP2018/083146 filed on Nov. 30, 2018, 3 pages.
International Preliminary Report on Patentability and Written Opinion dated May 20, 2020 in PCT/EP2018/083146 (English Translation only), 8 pages.
"Kunststoffhandbuch, Band 7, Polyurethane", Carl Hanser Verlag, 3. Auflage 1993, Kapitel 3.1, 19 pages.
Kunststoffhandbuch, Band VII, herausgegeben von Vieweg und Höchtlen, Carl Hanser Verlag, Müchen 1966 (S. 103-113), 27 pages.

* cited by examiner

Primary Examiner — John M Cooney
(74) Attorney, Agent, or Firm — Grüneberg and Myers PLLC

(57) ABSTRACT

The present invention relates to thermoplastic polyurethanes obtainable or obtained by a process comprising the reaction of a thermoplastic polyester (PE-1) with a diol (D1) to give a composition (Z1) comprising a polyester (PE-2), and the reaction of the composition (Z1) obtained in step (i) with an isocyanate composition (I1) comprising at least one polyisocyanate, and with a polyol composition (P1), where the polyol composition (P1) comprises at least one polycarbonate polyol (PC1), and also to a process for the production of the thermoplastic polyurethane. The present invention further relates to a composition comprising a thermoplastic polyurethane of the invention and at least one flame retardant. The present invention also relates to the use of this thermoplastic polyurethane for the production of cable sheathing, and also to films, moldings, rollers, fibers, automobile cladding, hoses, cable plugs, folding bellows, drag cables, cable sheathing, gaskets, belts or damping elements comprising this thermoplastic polyurethane.

19 Claims, No Drawings

AGING-RESISTANT TPU

The present invention relates to thermoplastic polyurethanes obtainable or obtained by a process comprising the reaction of a thermoplastic polyester (PE-1) with a diol (D1) to give a composition (Z1) comprising a polyester (PE-2), and the reaction of the composition (Z1) obtained in step (i) with an isocyanate composition (I1) comprising at least one polyisocyanate, and with a polyol composition (P1), where the polyol composition (P1) comprises at least one polycarbonate polyol (PC1), and also to a process for the production of the thermoplastic polyurethane. The present invention further relates to a composition comprising a thermoplastic polyurethane of the invention and at least one flame retardant. The present invention also relates to the use of this thermoplastic polyurethane for the production of cable sheathing, and also to films, moldings, rollers, fibers, automobile cladding, hoses, cable plugs, folding bellows, drag cables, cable sheathing, gaskets, belts or damping elements comprising this thermoplastic polyurethane.

Thermoplastic polyurethanes are well known on account of their good mechanical properties, their high abrasion resistance and their high resilience. They are therefore widely used in very many different applications. However, the individual applications are continually imposing stricter requirements in relation to aging resistance and hydrolysis resistance. Requirements relating to fire performance are moreover also frequently imposed.

Particularly stringent requirements are demanded by way of example for cables in automobile applications. Significant standards here for cables in automobile applications are LV 112 and ISO 6722, which place the materials in defined temperature classes.

Cables of temperature class C were hitherto adequate for use in automobile applications. It was sufficient that the coil test conventionally used for cables was passed after hot-air aging at 125° C. for 3000 h. In addition to this, good hydrolysis resistance to heat-aging under moist conditions for 1000 h at 85 degrees Celsius and 85 percent relative humidity has also frequently been demanded.

For new applications, manufacturers are often selecting, for applications in close proximity to the engine, cables in temperature D which are suitable up to 150° C. Examples here are the engine cable harness and connection to the transmission. In this context, electrical vehicles and hybrid vehicles impose particularly stringent requirements on cable harness and wiring systems, which bear little resemblance to the electrical systems conventionally used in vehicles hitherto.

These cables therefore have to withstand significantly higher temperatures than their predecessors—because of high voltages up to 1000 V and correspondingly high currents. The cables have to withstand the conventional coil test after hot-air aging for 3000 h at 150° C.

Among the materials used for temperature class D (up to 150° C.) are ethylene-tetrafluoroethylene copolymers (ETFE). When ETFE are used, corrosive gases are formed in the event of a fire, and this often restricts the use of those materials.

Specific crosslinked compounded polyolefin materials can also be used. However, the requirement for post-crosslinking by irradiation or vulcanization makes the production of crosslinked compounded polyolefin materials very complicated and expensive, and these materials are often borderline in terms of chemical stability and mechanical strength. These crosslinked materials are moreover disadvantageous in that they are not recyclable and, with molded-on plugs and bushes, give rise to water-ingress problems.

LV 112, which has now become the standard most frequently used, also requires higher performance in relation to hydrolysis resistance at high temperatures. While ISO 6722 regards 1000 hours at 85 degrees Celsius and 85 percent relative humidity as sufficient, here again LV 112 demands an operating time of 3000 hours.

The other requirements for cable sheathing are regulated in substantially identical manner in the two Standards, and are nowadays regarded as normal for all materials marketed for this purpose. Among these are resistance to low temperatures, solvent resistance and inhibition of fungal growth, and also compatibility with other materials in the cable harness, for example adhesive tapes, shrink sleeves and plugs.

However, for many applications there are no materials available that combine good mechanical properties with the particular requirements of automobile applications.

It was an object of the present invention to provide thermoplastic polyurethanes which combine the good mechanical and resilience properties of thermoplastic polyurethanes and also their high abrasion resistance, with higher resistance to heat and to hydrolysis.

Said object is achieved in the invention via a thermoplastic polyurethane obtainable or obtained by a process comprising the steps (i) and (ii):
(i) reaction of a thermoplastic polyester (PE-1) with a diol (D1) to give a composition (Z1) comprising a polyester (PE-2),
(ii) reaction of the composition (Z1) obtained in step (i) with an isocyanate composition (I1) comprising at least one polyisocyanate, and with a polyol composition (P1), where the polyol composition (P1) comprises at least one polycarbonate polyol (PC1).

The process of the invention comprises the steps (i) and (ii). In step (i) at least one thermoplastic polyester (PE-1) is reacted with a diol (D1) to give a composition (Z1) comprising a polyester (PE-2). In step (ii) of the process of the invention the composition (Z1) obtained in step (i) is reacted with an isocyanate composition (I1) comprising at least one polyisocyanate, and with a polyol composition (P1), where the polyol composition (P1) comprises at least one polycarbonate polyol (PC1).

The reaction in step (i) preferably takes place continuously. In another embodiment, the present invention accordingly provides a process for the production of a thermoplastic polyurethane as described above, where the reaction in step (i) takes place continuously.

The reaction in step (ii) takes place under suitable conditions permitting reaction of the diisocyanate with the free reactive groups. The reaction in the invention can take place in a suitable apparatus, suitable methods here being known per se to the person skilled in the art. It is also possible in the invention that additional substances or auxiliaries are used to accelerate or improve the reaction in step (i) or (ii). In particular, catalysts can be used.

Examples of suitable catalysts for the reaction in step (i) are tributyltin oxide, tin(II) diisooctanoate, dibutyltin dilaurate, tetrabutyl orthotitanate and Bi(II) carboxylates.

In particular, the reaction in step (i) or the reaction in step (ii) or the reaction in step (i) and step (ii) can take place in an extruder.

The reaction in step (i) can by way of example take place at a temperature in the range from 200 to 310° C. preferably in the range from 220 to 300° C. and in particular from 220 to 280° C., more preferably from 230 to 260° C., with a residence time of from 15 seconds to 30 minutes, preferably from 20 seconds to 10 minutes, in a condition of the polyester and of the diol that is by way of example flowable, softened or preferably molten, in particular via stirring, rolling, kneading or preferably extrusion, for example with use of conventional plastifying devices such as mills, kneaders or extruders, preferably in an extruder.

The process of the invention can comprise other steps, for example shaping steps or appropriate temperature adjustments.

Step (i) uses a thermoplastic polyester (PE-1). Thermoplastic polyesters suitable in the invention are known per se. Suitable polyesters are composed of at least one dicarboxylic acid and of at least one suitable dihydroxy compound. The polyesters can by way of example be produced by polycondensation of aliphatic or aromatic dicarboxylic acids, or mixtures of aromatic and aliphatic and/or cycloaliphatic dicarboxylic acids, or else the corresponding ester-forming derivatives, e.g. dicarboxylic anhydrides, monoesters and/or diesters, advantageously having at most 4 carbon atoms in the alcohol moiety, with aliphatic dihydroxy compounds at elevated temperatures, for example from 160 to 260° C., in the presence or absence of esterification catalysts.

Aromatic dicarboxylic acids are suitable in the invention, examples being naphthalenedicarboxylic acids, isophthalic acid and in particular terephthalic acid and mixtures of these dicarboxylic acids. Aliphatic and/or cycloaliphatic dicarboxylic acids are moreover suitable for the purposes of the present invention, for example those having from 4 to 14 carbon atoms, e.g. succinic, adipic, azelaic, sebacic, and dodecanedioic acid and/or cyclohexanedicarboxylic acid.

It is also possible in the invention to use polyesters of functionalized dicarboxylic acids, for example lactic-acid-based polyesters.

Compounds that can be used as other structural components of the thermoplastic polyesters (PE-1) for the purposes of the present invention are aliphatic or aromatic dihydroxy compounds. Compounds suitable as aliphatic dihydroxy compounds are preferably alkanediols having from 2 to 6 carbon atoms and cycloalkanediols having from 5 to 7 carbon atoms. By way of example, the following compounds may be mentioned and are used with preference: 1,2-ethanediol, 1,3-propanediol, 1,4-butanediol, 1,6-hexanediol, neopentyl glycol and 1,4-cyclohexanediol, and mixtures of at least two of the diols mentioned.

Materials suitable as thermoplastic polyesters are in particular thermoplastic polyesters selected from the group consisting of polyalkylene terephthalates and poly-L-lactic acid.

In another embodiment, the present invention also provides a thermoplastic polyurethane as described above where the thermoplastic polyester (PE-1) is selected from the group consisting of polyalkylene terephthalates and poly-L-lactic acid.

Suitable molecular weight ranges (Mn) in the invention for the polyester used are from 15,000 to 70,000, particularly preferably from 20 000 to 30,000.

In another embodiment, the present invention also provides a thermoplastic polyurethane as described above where the molar mass of the thermoplastic polyester (PE-1) is in the range from 15,000 g/mol to 70 000 g/mol.

Unless otherwise stated, for the purposes of the present invention the weight-average molecular weights Mw of the thermoplastic polyesters are determined in solution in HFIP (hexafluoroisopropanol) by means of GPC. Molecular weight is determined by using two GPC columns connected in series (PSS Gel; 100A; 5μ; 300*8 mm, Jordi Gel DVB; mixed bed; 5p; 250*10 mm; column temperature 60° C.; flow rate 1 mL/min; RI detector). Polymethyl methacrylate (EasyCal; PSS, Mainz) is used for calibration here, and HFIP is used as eluent.

In step (i) the thermoplastic polyester (PE-1) is reacted with a diol (D1). Compounds that can be used as diol (D1) are preferably aliphatic, araliphatic, aromatic and/or cycloaliphatic compounds with molar mass from 50 g/mol to 1000 g/mol, more preferably in the range from 50 g/mol to 750 g/mol. Suitable compounds are by way of example polyetherdiols with molar mass in the range from 50 g/mol to 1000 g/mol, more preferably in the range 50 g/mol to 750 g/mol, examples being polytetrahydrofurans. Other compounds likewise suitable are by way of example alkanediols having from 2 to 10 C atoms in the alkylene moiety, di-, tri-, tetra-, penta-, hexa-, hepta-, octa-, nona- and/or decaalkylene glycols having from 3 to 8 carbon atoms, in particular ethylene 1,2-glycol, 1,3-propanediol, 1,4-butanediol, 1,6-hexanediol, and preferably corresponding oligo- and/or polypropylene glycols, and mixtures of the diols can also be used here. It is preferable in the invention to use 1,4-butanediol or 1,2-ethanediol.

In another embodiment, the present invention also provides a thermoplastic polyurethane as described above where the diol (D1) is selected from the group consisting of diols having from 2 to 6 C atoms.

In step (i) a composition (Z1) comprising a polyester (PE-2) is obtained, and is then reacted in step (ii).

The composition (Z1) here is usually a mixture which can also comprise, alongside the polyester (PE-2), unreacted polyester (PE-1) or unreacted diol. The polyester (PE-2) here takes the form of a mixture in the invention, where the individual molecules can differ by way of example in the distribution and length of the polyester blocks. The molar mass of the polyester (PE-2) in the invention is preferably in the range from 1000 g/mol to 6000 g/mol, more preferably in the range from 1500 g/mol to 4500 g/mol, particularly preferably in the range from 2000 g/mol to 4000 g/mol.

In another embodiment, the present invention also provides a thermoplastic polyurethane as described above where the molar mass of the polyester (PE-2) is in the range from 1000 g/mo to 6000 g/mol.

In step (ii) the composition (Z1) is then reacted with an isocyanate composition (I1) and with a polyol composition (P1).

The polyol composition (P1) in the invention comprises at least one polycarbonate polyol (PC1). Suitable polycarbonate polyols are known per se to the person skilled in the art. Aliphatic polycarbonatediols are in particular suitable for the purposes of the present invention. Suitable polycarbonatediols are by way of example polycarbonatediols based on alkanediols. Suitable polycarbonatediols are strictly difunctional OH-functional polycarbonatediols, preferably strictly difunctional OH-functional aliphatic polycarbonatediols. Suitable polycarbonatediols are based by way of example on butanediol, pentanediol or hexanediol, in particular 1,4-butanediol, 1,5-pentanediol, 1,6-hexanediol, 3-methylpentane-(1,5)-diol or a mixture thereof, particularly preferably 1,4-butanediol, 1,5-pentanediol, 1,6-hexanediol or a mixture thereof. For the purposes of the present invention, preference is given to polycarbonatediols based on butanediol and hexanediol, polycarbonatediols based on pentanediol and hexanediol, polycarbonatediols based on hexanediol, and mixtures of two or more of said polycarbonatediols.

In another embodiment, the present invention also provides a thermoplastic polyurethane as described above where the at least one polycarbonate polyol (PC1) is selected from the group consisting of polycarbonatediols based on butanediol and hexanediol, polycarbonatediols based on pentanediol and hexanediol, polycarbonatediols based on hexanediol, and mixtures of two or more of said polycarbonatediols.

The number-average molecular weight Mn of the polycarbonatediols used is preferably in the range from 500 to 4000, determined by GPC with preference in the range from 650 to 3500, determined by GPC, with particular preference in the range from 800 to 3000, determined by GPC.

In another embodiment, the present invention also provides a thermoplastic polyurethane as described above where the number-average molecular weight Mn of the at least one polycarbonate polyol (PC1) is in the range from 500 to 4000, determined by GPC.

The polyol composition (P1) in the invention can comprise other polyols. Suitable polyols are known in principle to the person skilled in the art and are described by way of example in "Kunststoffhandbuch, Band 7, Polyurethane" [Plastics handbook, vol. 7, Polyurethanes], Carl Hanser Verlag, 3$^{rd}$ edn., 1993, chapter 3.1. It is particularly preferable to use polyesterols or polyetherols as polyols. Particular preference is given to polyester polyols. The number-average molar mass of the polyols used in the invention is preferably from 500 g/mo to 3000 g/mol, with preference from 600 g/mol to 2500 g/mol, in particular from 650 g/mol to 2000 g/mol.

Preferred polyetherols in the invention are polyethylene glycols, polypropylene glycols and polytetrahydrofurans.

The polyol composition in the invention can by way of example also comprise a solvent. Suitable solvents are known per se to the person skilled in the art.

For the purposes of the present invention, the reaction in the polyol composition can also use additional substances or auxiliaries, for example antioxidants, UV absorbers, UV filters, hydrolysis stabilizers, waxes, lubricants, plasticizers, processing aids, nucleating agents, fillers, flame retardants.

At least one isocyanate composition (I1), comprising at least one polyisocyanate, is used in the invention. It is preferable to use a diisocyanate as polyisocyanate. Mixtures of two or more diisocyanates can also be used in the invention. For the purposes of the present invention, preferred diisocyanates are in particular aliphatic or aromatic diisocycanates.

Compounds used as isocyanates are preferably aliphatic, cycloaliphatic, araliphatic and/or aromatic isocyanates, more preferably tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, diphenyldimethyl 3,3'-diisocyanate, 1,2-diphenylethane diisocyanate and/or phenylene diisocyanate. It is particularly preferable to use 4,4'MDI.

Compounds used as aliphatic diisocyanates are conventional aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylenedicyclohexyl 4,4'-, 2,4'- and/or 2,2'-diisocyanate (H12MDI).

In another embodiment, the present invention also provides a thermoplastic polyurethane as described above where the polyisocyanate is selected from the group consisting of hexamethylene diisocyanate and diphenylmethane diisocyanate (MDI).

The isocyanate composition can be used per se in the invention or in the form of a composition comprising the diisocyanate and at least one solvent. Suitable solvents are known to the person skilled in the art. Examples of suitable solvents are unreactive solvents such as ethyl acetate, methyl ethyl ketone, tetrahydrofuran and hydrocarbons.

It is possible in the invention to add other starting materials, for example catalysts, or auxiliaries and additional substances, during the reaction in step (ii).

Catalysts which in particular accelerate the reaction between the NCO groups and the hydroxy groups of the compounds reactive toward isocyanates are by way of example tertiary amines, in particular triethylamine, dimethylcyclohexylamine, N-methylmorpholine, N,N'-dimethylpiperazine, 2-(dimethylaminoethoxy)ethanol, diazabicyclo[2.2.2]octane; another preferred embodiment uses organometal compounds such as titanic esters, iron compounds, preferably iron(III) acetylacetonate, tin compounds, preferably tin diacetate, tin dioctanoate, tin dilaurate or the dialkyltin salts of aliphatic carboxylic acids, preferably dibutyltin diacetate, dibutyltin dilaurate, or bismuth salts in which bismuth is preferably present in the oxidation states 2 or 3, in particular 3. Preference is given to salts of carboxylic acids. Compounds preferably used as carboxylic acids are those having from 6 to 14 carbon atoms, particularly preferably having from 8 to 12 carbon atoms. Examples of suitable bismuth salts are bismuth(III) neodecanoate, bismuth 2-ethylhexanoate and bismuth octanoate. Quantities preferably used of the catalysts (d) are from 0.0001 to 0.1 part by weight per 100 parts by weight of the compound (b) reactive toward isocyanates. It is preferable to use tin catalysts, in particular tin dioctanoate.

Quantities usually used of the catalysts are from 3 ppm to 2000 ppm, preferably from 10 ppm to 1200 ppm, more preferably from 20 ppm to 1000 ppm and most preferably from 30 ppm to 800 ppm.

During the reaction in step (ii) it is also possible to add conventional auxiliaries, alongside catalysts. Mention may be made by way of example of surface-active substances, fillers, other flame retardants, nucleating agents, oxidation stabilizers, lubricants and demolding aids, dyes and pigments, optionally stabilizers, for example in respect of hydrolysis, light, heat or discoloration, inorganic and/or organic fillers, reinforcing agents and plasticizers. Suitable auxiliaries and additional substances can by way of example be found in Kunststoffhandbuch [Plastics handbook], vol. VII, eds. Vieweg and Höchtlen, Carl Hanser Verlag, Munich, 1966 (pp. 103-113).

A thermoplastic polyurethane is obtained in the invention. The properties of the thermoplastic polyurethane of the invention can vary widely. The Shore hardness of the thermoplastic polyurethane of the invention is preferably in the range from 45A to 78 D, with preference in the range from 80A to 70 D, with particular preference in the range from 85A to 95A.

In another embodiment, the present invention also provides a thermoplastic polyurethane as described above where the Shore hardness of the thermoplastic polyurethane is in the range from 45 Shore A to 78 Shore D.

In another aspect, the present invention also provides a process for the production of a thermoplastic polyurethane, comprising the steps (i) and (ii):
(i) reaction of a thermoplastic polyester (PE-1) with a diol (D1) to give a composition (Z1) comprising a polyester (PE-2),
(ii) reaction of the composition (Z1) obtained in step (i) with an isocyanate composition (I1) comprising at least one polyisocyanate, and with a polyol composition (P1),
where the polyol composition (P1) comprises at least one polycarbonate polyol (PC1).

In relation to preferred embodiments, reference is made to what has been said above.

The present invention moreover provides a composition comprising a thermoplastic polyurethane of the invention. The composition here can for the purposes of the present invention comprise other components such as fillers, glass fibers, plasticizers or flame retardants. The composition can comprise one or more of the components mentioned.

The present invention accordingly also provides a composition comprising at least components (A) and (B):
(A) a thermoplastic polyurethane according to any of claims 1 to 9,
(B) at least one flame retardant.

Suitable fillers, plasticizers or flame retardants are known per se to the person skilled in the art. Flame retardants that can be used with preference for the purposes of the present invention are selected from the group consisting of metal hydroxides, nitrogen-containing flame retardants and phosphorus-containing flame retardants.

In another embodiment, the present invention also provides a composition as described above where the flame retardant is selected from the group consisting of metal hydroxides, nitrogen-containing flame retardants and phosphorus-containing flame retardants.

The composition of the invention comprises a quantity of the at least one thermoplastic polyurethane that is usually in the range of 20% by weight to 90% by weight, based on the entire composition, preferably in the range from 50% by weight to 90% by weight, more preferably in the range from 60% to 85% by weight and more preferably in the range from 65% by weight to 85% by weight, based in each case on the entire composition.

In another embodiment, the present invention also provides a composition as described above where the total content of the thermoplastic polyurethanes in the composition is in the range from 20 to 90% by weight, based on the entire composition.

In one embodiment for the production of the composition of the invention, thermoplastic polyurethane and flame retardant are processed in a single operation. In other preferred embodiments for the production of the compositions of the invention, a thermoplastic polyurethane is first produced, preferably as granulate, by using a reactive extruder, a belt system or other suitable devices, and at least one other flame retardant is then introduced into same in at least one further operation, or else a plurality of operations.

The mixing of the thermoplastic polyurethane with the at least one flame retardant takes place by way of example in mixing equipment that is preferably an internal mixer or an extruder, preferably a twin-screw extruder. In another preferred embodiment with use of an extruder, the flame retardant introduced is liquid at the prevailing temperature downstream after addition of same into the extruder.

Suitable flame retardants are by way of example metal hydroxides. In the event of a fire, metal hydroxides liberate only water, and therefore form no toxic or corrosive smoke. Said hydroxides are moreover capable of reducing smoke density in the event of a fire. However, these substances have the disadvantage that in certain circumstances they promote the hydrolysis of thermoplastic polyurethanes and also influence the oxidative aging of same.

Compounds suitable for the purposes of the present invention are preferably hydroxides of magnesium, of calcium, of zinc and of aluminum, and mixtures of these. The metal hydroxide is particularly preferably selected from the group consisting of aluminum hydroxides, aluminum oxide hydroxides, magnesium hydroxide and a mixture of two or more of said hydroxides.

The compositions of the invention can also comprise a phosphorus-containing flame retardant. It is possible in principle in the invention to use any of the known phosphorus-containing flame retardants for thermoplastic polyurethanes.

It is preferable for the purposes of the present invention to use derivatives of phosphoric acid, derivatives of phosphonic acid or derivatives of phosphinic acid, or a mixture of two or more of said derivatives. In another preferred embodiment, the phosphorus-containing flame retardant is liquid at 21° C.

It is preferable that the derivatives of phosphoric acid, phosphonic acid or phosphinic acid are salts with organic or inorganic cation, or are organic esters. Organic esters are derivatives of phosphorus-containing acids in which at least one oxygen atom bonded directly to the phosphorus has been esterified with an organic moiety. In a preferred embodiment, the organic ester is an alkyl ester; in another preferred embodiment it is an aryl ester. It is preferable that all of the hydroxy groups of the corresponding phosphorus-containing acid have been esterified.

Examples of suitable organic phosphate esters are the triesters of phosphoric acid, for example trialkyl phosphates and in particular triaryl phosphates, an example being resorcinol bis(diphenyl phosphate).

Compounds suitable in the invention are in particular salts of the respective derivatives of phosphoric acid, phosphonic acid or phosphinic acid, more preferably phosphinate salts. An example of a compound suitable for the purposes of the present invention is melamine polyphosphate or diethylaluminum phosphinate.

For the purposes of the present invention, it is also possible to use nitrogen-containing flame retardants. It is in principle possible in the invention to use any of the known nitrogen-containing flame retardants for thermoplastic polyurethanes.

Melamine derivatives, for example in particular melamine polyphosphate or melamine cyanurate, are also suitable flame retardants for the purposes of the present invention.

For the purposes of the present invention, it is also possible that the composition comprises, alongside the thermoplastic polyurethane, a mixture of various flame retardants, for example a melamine derivative and a derivative of phosphoric acid, or a melamine derivative and a derivative of phosphinic acid, or a melamine derivative, a derivative of phosphoric acid and a derivative of phosphinic acid.

The melamine derivative can preferably be a melamine cyanurate. Accordingly, in another embodiment the present invention can also provide a composition which comprises by way of example, alongside the thermoplastic polyurethane, a melamine cyanurate and a derivative of phosphoric acid, or a melamine cyanurate and a derivative of phosphinic acid, or a melamine cyanurate, a derivative of phosphoric acid and a derivative of phosphinic acid. By way of example, the composition of the invention comprises at least one thermoplastic polyurethane, at least melamine cyanurate, at least one first phosphorus-containing flame retardant (F1) selected from the group consisting of derivatives of phosphoric acid and derivatives of phosphonic acid, and at least one other phosphorus-containing flame retardant (F2) selected from the group consisting of derivatives of phosphinic acid.

It is preferable that the composition comprises no other flame retardants alongside the melamine cyanurate, the at least one phosphorus-containing flame retardant (F1) and the at least one phosphorus-containing flame retardant (F2). The composition of the invention more preferably comprises melamine cyanurate, precisely one phosphorus-containing flame retardant (F1) selected from the group consisting of derivatives of phosphoric acid and derivatives of phosphonic acid, and precisely one phosphorus-containing flame retardant (F2) selected from the group consisting of derivatives of phosphinic acid.

The present invention also provides the use of the composition of the invention comprising at least one flame-retardant thermoplastic polyurethane as described above for the production of coatings, damping elements, folding bellows, films or fibers, moldings, floors for buildings and transport, random-laid webs, and preferably gaskets, rollers, shoe soles, hoses, cables, cable plugs, cable sheathing, cushions, laminates, profiles, belts, saddles, foams, plug connectors, drag cables, solar modules, automobile cladding. Preference is given to the use for the production of cable sheathing. The production method used, preferably starting from granulates, is injection molding, calendering, powder sintering, or extrusion, and/or additional foaming of the composition of the invention.

In another aspect, the present invention also provides the use of a thermoplastic polyurethane as described above or of a composition as described above for the production of cable sheathing.

By virtue of good mechanical properties and good behavior in respect of temperature changes, the thermoplastic polyurethanes of the invention, and also the compositions of the invention are in particular suitable for the production of films, moldings, rollers, fibers, automobile cladding, hoses, cable plugs, folding bellows, drag cables, cable sheathing, gaskets, belts or damping elements.

Accordingly, the present invention also provides films, moldings, rollers, fibers, automobile cladding, hoses, cable plugs, folding bellows, drag cables, cable sheathing, gaskets, belts or damping elements comprising a thermoplastic polyurethane as described above or a composition as described above.

Other embodiments of the present invention can be found in the claims and the examples. The abovementioned features of the product/process/uses of the invention, and the features thereof explained below, can of course be used not only in the respective combination stated but also in other combinations without exceeding the scope of the invention. The invention therefore by way of example also implicitly comprises the combination of a preferred feature with a particularly preferred feature, or of a feature that is not further characterized with a particularly preferred feature, etc., even if said combination is not expressly mentioned. Examples of embodiments of the present invention are listed below, but do not restrict the present invention. In particular, the present invention also comprises embodiments resulting from the dependencies stated below, and thus from combinations.

1. A thermoplastic polyurethane obtainable or obtained by a process comprising the steps (i) and (ii):
   (i) reaction of a thermoplastic polyester (PE-1) with a diol (D1) to give a composition (Z1) comprising a polyester (PE-2),
   (ii) reaction of the composition (Z1) obtained in step (i) with an isocyanate composition (I1) comprising at least one polyisocyanate, and with a polyol composition (P1), where the polyol composition (P1) comprises at least one polycarbonate polyol (PC1).

2. The thermoplastic polyurethane according to embodiment 1, where the at least one polycarbonate polyol (PC1) is selected from the group consisting of polycarbonatediols based on butanediol and hexanediol, polycarbonatediols based on pentanediol and hexanediol, polycarbonatediols based on hexanediol, and mixtures of two or more of said polycarbonatediols.

3. The thermoplastic polyurethane according to embodiment 1 or 2, where the number-average molecular weight Mn of the at least one polycarbonate polyol (PC1) is in the range from 500 to 4000, determined by GPC.

4. The thermoplastic polyurethane according to any of embodiments 1 to 3, where the molar mass of the thermoplastic polyester (PE-1) is in the range form 15,000 g/mol to 70 000 g/mol.

5. The thermoplastic polyurethane according to any of embodiments 1 to 4, where the thermoplastic polyester (PE-1) is selected from the group consisting of polyalkylene terephthalates and poly-L-lactic acid.

6. The thermoplastic polyurethane according to any of embodiments 1 to 5, where the diol (D1) is selected from the group consisting of aliphatic, araliphatic, aromatic and cycloaliphatic diols with molar mass in the range from 50 g/mol to 1000 g/mol.

7. The thermoplastic polyurethane according to any of embodiments 1 to 6, where the diol (D1) is selected from the group consisting of diols having from 2 to 6 C atoms.

8. The thermoplastic polyurethane according to any of embodiments 1 to 7, where the molar mass of the polyester (PE-2) is in the range from 1000 g/mol to 6000 g/mol.

9. The thermoplastic polyurethane according to any of embodiments 1 to 8, where the polyisocyanate is selected from the group consisting of hexamethylene diisocyanate and diphenylmethane diisocyanate (MDI).

10. The thermoplastic polyurethane according to any of embodiments 1 to 9, where the Shore hardness of the thermoplastic polyurethane is in the range from 45 Shore A to 78 Shore D.

11. A process for the production of a thermoplastic polyurethane, comprising the steps (i) and (ii):
   (i) reaction of a thermoplastic polyester (PE-1) with a diol (D1) to give a composition (Z1) comprising a polyester (PE-2),
   (ii) reaction of the composition (Z1) obtained in step (i) with an isocyanate composition (I1) comprising at least one polyisocyanate, and with a polyol composition (P1), where the polyol composition (P1) comprises at least one polycarbonate polyol (PC1).

12. The process according to embodiment 11, where the at least one polycarbonate polyol (PC1) is selected from the group consisting of polycarbonatediols based on butanediol and hexanediol, polycarbonatediols based on pentanediol and hexanediol, polycarbonatediols based on hexanediol, and mixtures of two or more of these polycarbonatdiols.

13. The process according to embodiment 11 or 12, where the number-average molecular weight Mn of the at least one polycarbonate polyol (PC1) is in the range from 500 to 4000, determined by GPC.

14. The process according to any of embodiments 11 to 13, where the molar mass of the thermoplastic polyester (PE-1) is in the range from 15,000 g/mol to 70 000 g/mol.

15. The process according to any of embodiments 11 to 14, where the thermoplastic polyester (PE-1) is selected from the group consisting of polyalkylene terephthalates and poly-L-lactic acid.

16. The process according to any of embodiments 11 to 15, where the diol (D1) is selected from the group consisting of aliphatic, araliphatic, aromatic and cycloaliphatic diols with molar mass in the range from 50 g/mol to 1000 g/mol.

17. The process according to any of embodiments 11 to 16, where the diol (D1) is selected from the group consisting of diols having from 2 to 6 C atoms.

18. The process according to any of embodiments 11 to 17, where the molar mass of the polyester (PE-2) is in the range from 1000 g/mol to 6000 g/mol.

19. The process according to any of embodiments 11 to 18, where the polyisocyanate is selected from the group consisting of hexamethylene diisocyanate and diphenylmethane diisocyanate (MDI).

20. The process according to any of embodiments 11 to 19, where the Shore hardness of the thermoplastic polyurethane is in the range from 45 Shore A to 78 Shore D.

21. A composition comprising at least components (A) and (B):
(A) a thermoplastic polyurethane according to any of embodiments 1 to 9,
(B) at least one flame retardant.

22. The composition according to embodiment 21, where the flame retardant is selected from the group consisting of metal hydroxides, nitrogen-containing flame retardants and phosphorus-containing flame retardants.

23. The composition according to embodiment 21 or 22, where the total content of the thermoplastic polyurethanes in the composition is in the range from 20% by weight to 80% by weight, based on the entire composition.

24. The use of a thermoplastic polyurethane according to any of embodiments 1 to 10 or of a composition according to any of embodiments 21 to 23 for the production of cable sheathing.

25. The use of a thermoplastic polyurethane according to any of embodiments 1 to 10 for the production of cable sheathing.

26. The use of a composition according to any of embodiments 21 to 23 for the production of cable sheathing.

27. A film, molding, roller, fiber, automobile cladding, hose, cable plug, folding bellows, drag cable, cable sheathing, gasket, belt or damping element comprising a thermoplastic polyurethane according to any of embodiments 1 to 10 or a composition according to any of embodiments 21 to 23.

28. A film, molding, roller, fiber, automobile cladding, hose, cable plug, folding bellows, drag cable, cable sheathing, gasket, belt or damping element comprising a thermoplastic polyurethane according to any of embodiments 1 to 10.

29. A film, molding, roller, fiber, automobile cladding, hose, cable plug, folding bellows, drag cable, cable sheathing, gasket, belt or damping element comprising a composition according to any of embodiments 21 to 23.

The examples below serve to illustrate the invention, but are in no way restrictive in respect of the subject matter of the present invention.

EXAMPLES

1. Raw Materials:
Poly PTHF®1000: Polytetrahydrofuran 1000, CAS number: 25190-06-1, BASF SE, 67056 Ludwigshafen, GERMANY, Intermediates Division.

1,4-Butanediol: Butane-1,4-diol, CAS number: 110-63-4, BASF SE, 67056 Ludwigshafen, GERMANY, Intermediates Division.

Lupranat MET: 4,4'-Methylenediphenyl diisocyanate, CAS number: 101-68-8, BASF SE, 67056 Ludwigshafen, GERMANY.

Polyol A: Copolyesterdiol based on 1,4-butanediol, 1,6-hexanediol (ratio 2:1) and adipic acid, water content % (w/w)<0.1, acid number [KOH mg/g]<0.6, OH number [KOH mg/g]=48-53.

Capromer PD1-20 (PolyCLO NPG2000): Polycaprolactone, CAS number: 69089-45-8, water content % (w/w) <0.1, acid number [KOH mg/g]<0.25, OH number [KOH mg/g]=54-58.

Eternacoll PH-200 D: Polycarbonatediol based on 1,6-hexanediol and 1,5-pentanediol in the ratio 1:1, water content % (w/w)<0.1, acid number [KOH mg/g]<0.1, OH number [KOH mg/g]=51-61; UBE Chemical Europe S.A., 28016 Madrid, Spain.

Irganox 1010: Pentaerythritol tetrakis(3-(3,5-di-tert-butyl-4-hydroxyphenyl)propionate), CAS Number: 6683-19-8, BASF SE, 67056 Ludwigshafen, GERMANY.

Irganox 1098: N,N'-Hexane-1,6-diylbis[3-(3,5-di-tert-butyl-4-hydroxyphenylpropionamide], CAS number: 23128-74-7, BASF SE, 67056 Ludwigshafen, GERMANY.

Elastostab H01: Hydrolysis stabilizer for polyester polyurethane, BASF Polyurethanes GmbH, 49440 Lemfoerde, GERMANY.

Tin dioctanoate: Catalyst metal 93690, tin bis(2-ethylhexanoate), CAS number: 301-10-0, BASF Polyurethanes GmbH, 49440 Lemfoerde, GERMANY.

Melapur MC 15 ED: Melamine cyanurate (1,3,5-triazine-2,4,6(1H,3H,5H)trione, with 1,3,5-triazine-2,4,6-triamine (1:1)), CAS #: 37640-57-6, BASF SE, 67056 Ludwigshafen, GERMANY, particle size D99%</=50 µm, D50%<=4.5 µm, water content % (w/w)<0.2.

Ultradur B4500 NAT: Polymer based on: polybutylene terephthalate (PBT), BASF SE, 67056 Ludwigshafen, GERMANY.

2. Production by the Manual Casting Process

The quantity specified in the parent formulation of polyol and of the chain extenders is weighed in a tin-plated steel container and briefly blanketed with nitrogen. The container is closed with a lid and heated to about 90° C. in an oven.

Another oven is preheated to 80° C. for the heat-conditioning of the skin. The Teflon dish is placed on the hotplate, which is set to 125° C.

The calculated quantity of liquid isocyanate is determined volumetrically. For this, the liquid isocyanate is weighed in a PE beaker and poured out within 10 s into a PE beaker (the volumetric determination being carried out for MDI at a temperature of about 48° C.). The resultant emptied beaker is then tared, and the calculated quantity of isocyanate is charged thereto. In the case of MDI, this is stored at about 48° C. in an oven.

Additions such as hydrolysis stabilizer, antioxidant, etc., where these are solid at RT, are weighed in directly.

The preheated polyol is placed on an elevating platform under the stirrer, which is at rest. The reaction vessel is then raised by the elevating platform until the stirrer blades are completely immersed in the polyol.

Before the stirrer motor is switched on, it is vital to ensure that the rotation rate controller is set at zero. The rotation rate is then slowly controlled upward in a manner that ensures good mixing without incorporation of air.

Additives, e.g. antioxidants, are then added to the polyol.

The temperature of the reaction mixture is carefully set to 80° C. by using a hot-air blower.

If necessary, prior to addition of isocyanate, catalyst is metered into the reaction mixture by using a microliter syringe. Isocyanate is then added at 80° C. by introducing the quantity previously determined volumetrically within a period of 10 s into the reaction mixture. The weight is monitored by reweighing. Deviations of ±0.2 g from the quantity in the formulation are recorded. The stopwatch is started when the isocyanate is added. When the temperature reaches 110° C., the reaction mixture is poured out into the Teflon dishes, which have been preheated to 125° C.

10 min after the stopwatch was started, the skin is removed from the hotplate and then stored at 80° C. for 15 h in an oven. The cooled skin is comminuted in the chopper mill. The granulate is then dried at 110° C. for 3 h and stored under dry conditions.

This method can also in principle be used in a reactive extruder or in the belt process.

3. Reactive Extruder Process—Production as Described in EP 1419188 B1

The TPU described below were produced in a ZSK 58 twin-screw extruder from Werner & Pfleiderer. The length of the processing section of the extruder was 12 barrel sections, and the length of the actual barrel sections was 4 times the screw diameter. A gear pump was used to discharge material from the extruder; conventional underwater pelletization equipment was used for granulation. The resultant granulate was then dried in a fluidized-bed dryer at from 60° to 100° C. with residence times of from 5 to 10 min. to water content <0.03%, and then heat-conditioned for 15 hours at 80° C.

The temperatures of the extruder barrel sections were as follows: 1-260° C., 2-4—from 290 to 250° C., 5-240° C., 6-12, inclusive of melt-discharge equipment—230° C. Under these conditions, the resultant melt temperature with throughput about 200 kg/h and rotation rate 200 rpm was from 220-230° C.

A commercially available polybutylene terephthalate (Ultradur® B 4500/BASF Aktiengesellschaft) was used as semicrystalline, high-molecular-weight polyester, 1,4-butanediol was used as low-molecular-weight diol for the degradation of the high-molecular-weight PBT, and 4,4'-diisocyanatodiphenylmethane (MDI) was used as aromatic diisocyanate. The polydiols (PDO) used are described and characterized in Table 1.

Ultradur® granulate was metered continuously into barrel section 1 of the twin-screw extruder, and 1,4-butanediol was metered into barrel section 3 together with tin dioctanoate as catalyst to accelerate degradation. Polyol, MDI and tin dioctanoate were added in barrel section 5 of the twin-screw extruder. Stabilizers (Elastostab H01 and Irganox 1125) were metered into barrel section 8 of the twin-screw extruder via metering equipment attached at the side.

4. Compounding

The respective mixtures were produced by ZE 40 A twin-screw extruder from Berstorff, the length of the processing section being 35 D, divided into 10 barrel sections. The flame retardant was metered into zone 5 here. Conventional underwater pelletization equipment was used for granulation. The resultant granulate was then dried in a fluidized-bed dryer at from 60° to 100° C. with residence times of from 5 to 10 min. to water content <0.03%, and then heat-conditioned for 15 hours at 80° C.

5. Formulations of TPU 1-7

TABLE 1

| | TPU 1 | TPU 2 | TPU 3 | TPU 4 | TPU 5 | TPU 6 | TPU 7 |
|---|---|---|---|---|---|---|---|
| Production process | Manual casting | Manual casting | Manual casting | Extruder process | Extruder process | Extruder process | Extruder process |
| PTHF 1000 | 1000 | | | 1000 | | | |
| Polyol A | | 1000 | | | 1000 | | |
| Capromer | | | | | | 1000 | |
| PD1-20 | | | | | | | |
| Eternacoll PH-200D | | | 1000 | | | | 1000 |
| Ultradur B4500 NAT | | | | 785.312 | 434.9 | 483.54 | 714.354 |
| Lupranat MET | 630 | 440 | 565 | 400.125 | 195.08 | 203.71 | 224.096 |
| 1,4-Butanediol | 136.74 | 111.62 | 156.64 | 48.954 | 20.66 | 22.89 | 32.146 |

0.5% of Irganox 1010, 0.5% of Irganox 1098, 1% of Elastostab H01, and also 200 ppm of tin dioctanoate as catalyst were respectively added to all of the formulations.

6. Formulations of flame-retardant TPU—Compounded material 1-4

TABLE 2

|  | Compounded material 1 (comparative example) | Compounded material 2 (comparative example) | Compounded material 3 (comparative example) | Compounded material 4 (of the invention) |
|---|---|---|---|---|
| Production process | Compounding | Compounding | Compounding | Compounding |
| TPU 1 | 80 | | | |
| TPU 3 | | 80 | | |
| TPU 4 | | | 80 | |
| TPU 7 | | | | 80 |
| Melapur MC 15 ED | 20 | 20 | 20 | 20 |
| MFR 190° C. 2.16 kg [g/10 min] DIN EN ISO 1133 | 17 | 32 | 21 | 61 |

7. Production of Test Specimens

An Arenz single-screw extruder with three-zone screw with mixing section (screw ratio 1:3) was used to extrude films of thickness 1.6 mm from the granulates.

8. Determination of Mechanical Properties

The following were measured on the corresponding test samples: tensile strength or elongation at break (in accordance with DIN 53504), density (DIN EN ISO 1183-1, A), tear strength (DIN ISO 34-1, (b)), abrasion (DIN 53516) and Shore A hardness (in accordance with DIN 53505).

TABLE 3

|  | TPU 1 | TPU 2 | TPU 3 | TPU 4 | TPU 5 | TPU 6 | TPU 7 |
|---|---|---|---|---|---|---|---|
| Density [g/cm$^3$] | 1.12 | 1.19 | 1.21 | 1.16 | 1.19 | 1.18 | 1.23 |
| Shore A | 87 | 87 | 91 | 91 | 85 | 85 | 92 |
| Tensile strength [MPa] | 45 | 50 | 43 | 41 | 45 | 46 | 47 |
| Elongation at break [%] | 600 | 650 | 490 | 730 | 750 | 690 | 500 |
| Tear strength [kN/m] | 70 | 70 | 114 | 87 | 65 | 69 | 117 |
| Abrasion [mm$^3$] | 25 | 30 | 38 | 36 | 35 | 43 | 38 |

TABLE 4

| Standard mechanical properties | | Compounded material 1 (comparative example) | Compounded material 2 (comparative example) | Compounded material 3 (comparative example) | Compounded material 4 (of the invention) |
|---|---|---|---|---|---|
| Density [g/cm$^3$] | [g/cm$^3$] | 1.193 | 1.263 | 1.229 | 1.293 |
| Shore A | [A] | 91 | 87 | 96 | 96 |
| Tensile strength [MPa] | [MPa] | 42 | 35 | 18 | 26 |
| Elongation at break [%] | [%] | 540 | 550 | 600 | 510 |
| Tear strength [kN/m] | [kN/m] | 65 | 78 | 73 | 102 |
| Abrasion [mm$^3$] | [mm$^3$] | 31 | 44 | 55 | 34 |

9. Determination of Aging Resistance and Hydrolysis Resistance

The expression "oxidative aging" is used in the context of this invention when the mechanical parameters of the thermoplastic polyurethanes, for example tensile strength, elongation at break, tear strength, flexibility, impact resistance, softness, etc., undergo adverse changes over the course of time.

Resistance to oxidative aging is evaluated by suspending a test sample in a convection oven at 150° C. for 3000 h, at 175° C. for 240 h and at 200° C. for 6 h, and then determining mechanical parameters. The tables below collate the results.

Hydrolysis resistance is evaluated by storing a test sample at 85° C. and 85% relative humidity for 3000 hours, and then determining mechanical parameters. The tables below collate the results.

TABLE 5

|  |  | TPU 1 | TPU 2 | TPU 3 | TPU 4 | TPU 5 | TPU 6 | TPU 7 |
|---|---|---|---|---|---|---|---|---|
| Hot-air aging 200° C./6 h | | | | | | | | |
| Tensile strength [MPa] | | ** | ** | ** | 20 | ** | ** | 26 |
| (Difference from 0 h [%]) | | | | | (−51) | | | (−45) |
| Elongation at break [%] | | ** | ** | ** | 590 | ** | ** | 670 |
| (Difference from 0 h [%]) | | | | | (−19) | | | (+34) |
| Hot-air aging 175° C./240 h | | | | | | | | |
| Tensile strength [MPa] | [MPa] | ** | ** | ** | ** | 18 | 23 | 27 |
| (Difference from 0 h [%]) | | | | | | (−60) | (−50) | (−43) |
| Elongation at break [%] | [%] | ** | ** | ** | ** | 340 | 460 | 300 |
| (Difference from 0 h [%]) | | | | | | (−54) | (−33) | (−40) |
| Hot-air aging 150° C./3000 h | | | | | | | | |
| Tensile strength [MPa] | [MPa] | ** | 9 | 41 | ** | 17 | 21 | 20 |
| (Difference from 0 h [%]) | | | (−82) | (−5) | | (−62) | (−54) | (−58) |
| Elongation at break [%] | [%] | ** | 420 | 190 | ** | 310 | 250 | 310 |
| (Difference from 0 h [%]) | | | (−35) | (−61) | | (−58) | (−74) | (−38) |
| Humid heat 85/85/3000 h | | | | | | | | |
| Tensile strength [MPa] | [MPa] | 31 | ** | 36 | 21 | ** | ** | 25 |
| (Difference from 0 h [%]) | | (−31) | | (−16) | (−49) | | | (−47) |
| Elongation at break [%] | [%] | 470 | ** | 470 | 770 | ** | ** | 250 |
| (Difference from 0 h [%]) | | (−22) | | (−4) | (+5) | | | (−50) |

** sample destroyed

The TPU 7 of the invention meets the requirements of temperature class D, and also the more stringent specifications of LV112 for hydrolysis resistance.

TABLE 6

|  |  | Compounded material 1 (comparative example) | Compounded material 2 (comparative example) | Compounded material 3 (comparative example) | Compounded material 4 (of the invention) |
|---|---|---|---|---|---|
| Hot-air aging 200° C./6 h | | | | | |
| Tensile strength [MPa] (Difference from 0 h [%]) | [MPa] | ** | ** | 8(−56) | 14(−46) |
| Elongation at break [%] (Difference from 0 h [%]) | [%] | ** | ** | 130(−78) | 490(−4) |
| Hot-air aging 175° C./240 h | | | | | |
| Tensile strength [MPa] (Difference from 0 h [%]) | [MPa] | ** | ** | 11(−39) | 18(−31) |
| Elongation at break [%] (Difference from 0 h [%]) | [%] | ** | ** | 2(−100) | 280(−45) |
| Hot-air aging 165° C./1000 h | | | | | |
| Tensile strength [MPa] (Difference from 0 h [%]) | [MPa] | ** | ** | ** | 14(−46) |

TABLE 6-continued

|  |  | Compounded material 1 (comparative example) | Compounded material 2 (comparative example) | Compounded material 3 (comparative example) | Compounded material 4 (of the invention) |
|---|---|---|---|---|---|
| Elongation at break [%] (Difference from 0 h [%]) Hot-air aging 150° C./3000 h | [%] | ** | ** | ** | 100(−80) |
| Tensile strength [MPa] (Difference from 0 h [%]) | [MPa] | ** | ** | ** | 17(−35) |
| Elongation at break [%] (Difference from 0 h [%]) Humid heat 85/85/3000 h | [%] | ** | ** | ** | 160(−69) |
| Tensile strength [MPa] (Difference from 0 h [%]) | [MPa] | 14(−67) | 15(−57) | 8(−56) | 10(−62) |
| Elongation at break [%] (Difference from 0 h [%]) | [%] | 630(+17) | 580(+5) | 120(−80) | 380(−25) |

** sample destroyed

Compounded material 4 of the invention meets the requirements of temperature class D, and also the more stringent specifications of LV112 for hydrolysis resistance.

REFERENCES

"Kunststoffhandbuch, Band 7, Polyurethane" [Plastics handbook, vol. 7, Polyurethanes], Carl Hanser Verlag, 3$^{rd}$ edn., 1993, chapter 3.1

Kunststoffhandbuch, Band VII [Plastics handbook, vol. VII], eds. Vieweg and Höchtlen, Carl Hanser Verlag, Munich, 1966 (pp. 103-113)

The invention claimed is:

1. A thermoplastic polyurethane obtained by a process, comprising:
 (i) reacting a thermoplastic polyester (PE-1) with a diol (D1) to give a composition (Z1) comprising a polyester (PE-2), and
 (ii) reacting the composition (Z1) with an isocyanate composition (I1) comprising a polyisocyanate, and with a polyol composition (P1), wherein the polyol composition (P1) comprises a polycarbonate polyol (PC1), wherein a molar mass of the thermoplastic polyester (PE-1) is in a range from 15,000 g/mol to 70 000 g/mol and a molar mass of the polyester (PE-2) is in a range from 1000 g/mol to 6000 g/mol,
 wherein the diol (D1) is 1,4-butanediol, and
 wherein the thermoplastic polyester (PEA) is selected from the group consisting of a polyalkylene terephthalate and poly-L-lactic acid.

2. The thermoplastic polyurethane according to claim 1, wherein the polycarbonate polyol (PC1) is at least one selected from the group consisting of a polycarbonatediol based on butanediol and hexanediol, a polycarbonatediol based on pentanediol and hexanediol, and a polycarbonatediol based on hexanediol.

3. The thermoplastic polyurethane according to claim 1, wherein a number-average molecular weight Mn of the polycarbonate polyol (PCI) is in a range from 500 to 4000, determined by GPC.

4. The thermoplastic polyurethane according to claim 1, wherein the polyisocyanate is selected from the group consisting of hexamethylene diisocyanate and diphenylmethane diisocyanate.

5. The thermoplastic polyurethane according to claim 1, wherein a Shore hardness of the thermoplastic polyurethane is in a range from 45 Shore A to 78 Shore D.

6. A process for producing a thermoplastic polyurethane, the process comprising:
 (i) reacting a thermoplastic polyester (PE-1) with a diol (D1) to give a composition (Z1) comprising a polyester (PE-2), and
 (ii) reacting the composition (Z1) with an isocyanate composition (I1) comprising a polyisocyanate, and with a polyol composition (P1),
 wherein the polyol composition (P1) comprises a polycarbonate polyol (PC1), wherein a molar mass of the thermoplastic polyester (PE-1) is in a range from 15,000 g/mol to 70 000 g/mol and a molar mass of the polyester (PE-2) is in a range from 1000 g/mol to 6000 g/mol,
 wherein the diol (D1) is 1,4-butanediol, and
 wherein the thermoplastic polyester (PE-1) is selected from the group consisting of a polyalkylene terephthalate and poly-L-lactic acid.

7. A composition comprising components (A) and (B):
 (A) the thermoplastic polyurethane according to claim 1,
 (B) a flame retardant.

8. The composition according to claim 7, wherein the flame retardant is selected from the group consisting of a metal hydroxide, a nitrogen-containing flame retardant and a phosphorus-containing flame retardant.

9. The composition according to claim 7, wherein a total content of the thermoplastic polyurethanes in the composition is from 20% by weight to 80% by weight, based on an entire composition.

10. A cable sheathing, comprising the thermoplastic polyurethane according to claim 1.

11. A film, molding, roller, fiber, automobile cladding, hose, cable plug, folding bellows, drag cable, cable sheathing, gasket, belt or damping element comprising the thermoplastic polyurethane according to claim 1.

12. The thermoplastic polyurethane according to claim 1, wherein the polycarbonate polyol (PC1) comprises a polycarbonate diol based on pentanedial and hexanediol, and wherein the thermoplastic polyester (PE-1) comprises polybutylene terephthalate.

13. The thermoplastic polyurethane according to claim 1, wherein the thermoplastic polyester (PE-1) comprises polybutylene terephthalate.

14. The thermoplastic polyurethane according to claim 1, wherein the thermoplastic polyester (PE-1) is selected from the group consisting of polyalkylene terephthalates.

15. The thermoplastic polyurethane according to claim 1, wherein the thermoplastic polyester (PE-1) comprises a poly-L-lactic acid.

16. The thermoplastic polyurethane according to claim 1, wherein the polycarbonate polyol (PC1) is based on butanediol and hexanediol.

17. The thermoplastic polyurethane according to claim 1, wherein the polycarbonate polyol (PC1) is based on pentanedial and hexanediol.

18. The thermoplastic polyurethane according to claim 1, wherein the polycarbonate polyol (PC1) is based on hexanediol.

19. The thermoplastic polyurethane according to claim 2, wherein the thermoplastic polyester (PE-1) comprises polybutylene terephthalate.

\* \* \* \* \*

UNITED STATES PATENT AND TRADEMARK OFFICE
CERTIFICATE OF CORRECTION

| | |
|---|---|
| PATENT NO. | : 11,851,523 B2 |
| APPLICATION NO. | : 16/768408 |
| DATED | : December 26, 2023 |
| INVENTOR(S) | : Henze et al. |

It is certified that error appears in the above-identified patent and that said Letters Patent is hereby corrected as shown below:

On the Title Page

Column 2, Line 8 in OTHER PUBLICATIONS currently reads:
""Kunstoffhandbuch,"
And should read:
--"Kunststoffhandbuch,--;

Column 2, Line 10 in OTHER PUBLICATIONS currently reads:
"Kunstoffhandbuch,"
And should read:
--Kunststoffhandbuch,--; and Column 2, Line 11 in OTHER PUBLICATIONS currently reads:
"Müchen"
And should read:
--München--.

Signed and Sealed this
Fourteenth Day of May, 2024

Katherine Kelly Vidal
*Director of the United States Patent and Trademark Office*